July 7, 1936.  E. L. BARRETT  2,046,911
REMOTE CONTROL DEVICE FOR RADIO RECEIVING SETS
Filed Dec. 27, 1932
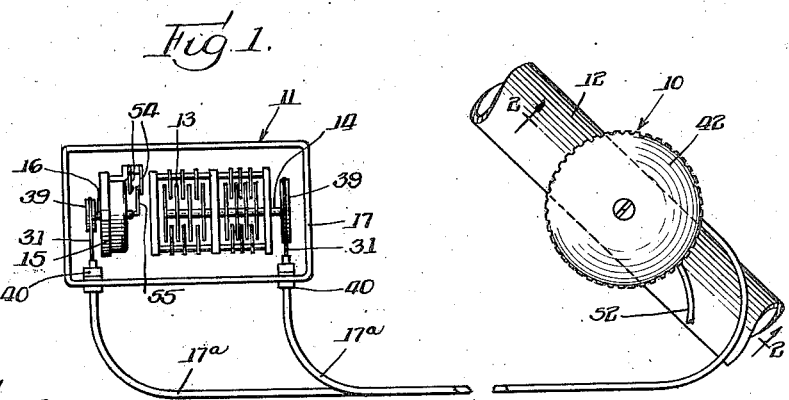
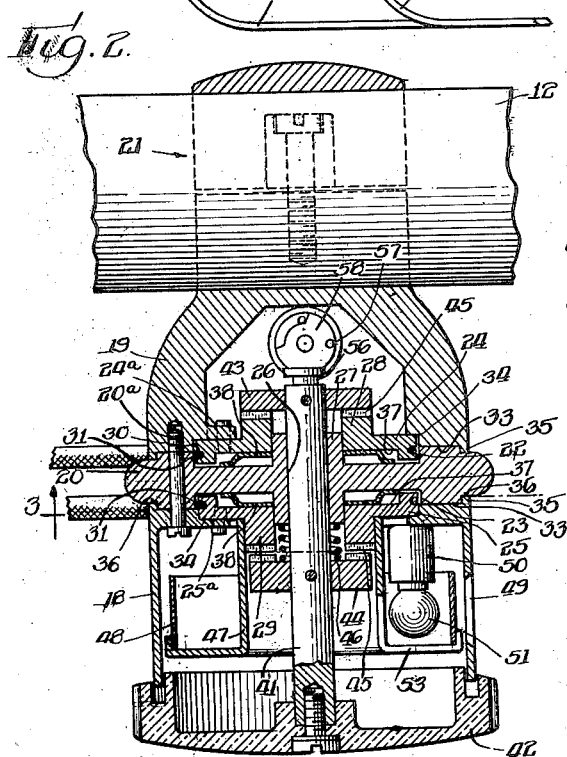
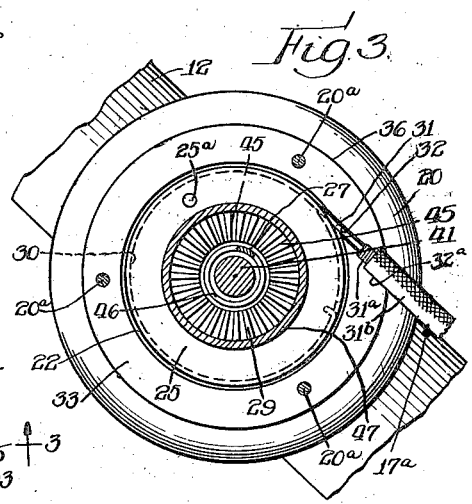
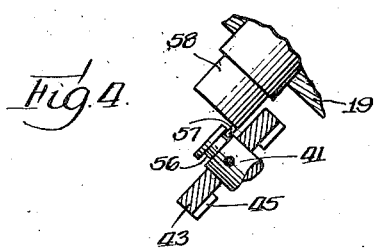
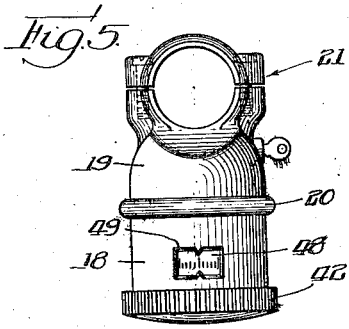
Inventor:
Edward L. Barrett
By Christdahl Parker Carlson
attys Patented July 7, 1936

2,046,911

UNITED STATES PATENT OFFICE 2,046,911

REMOTE CONTROL DEVICE FOR RADIO RECEIVING SETS

Edward L. Barrett, Chicago, Ill., assignor to Utah Radio Products Co., Chicago, Ill., a corporation of Illinois Application December 27, 1932, Serial No. 648,839

10 Claims. (Cl. 250—20)

The invention relates generally to remote control devices and more particularly to a device of this character which is particularly suitable for controlling the operation of a radio receiving set from a distant point.

An object of the invention is to provide an improved remote control device of novel construction for effecting operative adjustment of a radio receiving set which is located in a normally inaccessible position, such, for example, as where the receiving set is installed in an automobile or other vehicle.

Another object of the invention is to provide, in such a control device, a single manipulator for effecting all necessary adjustments of reception of the receiving set.

More specifically stated, an object of the invention resides in the provision of a remote control device embodying means for tuning the receiving set to different positions of reception and means for effecting volume control by a single manipulator which is arranged for convenient actuation by the operator and selectively controls the operation of either of said means.

Another object is to provide a novel combination by which the mechanism may be locked in inoperative condition.

Other objects and advantages will become apparent in the following description and from the accompanying drawing, in which:

Fig. 1 is a somewhat diagrammatic view showing a device embodying the features of the invention.

Fig. 2 is an axial section through the remote control device and is taken as indicated along the line 2—2 of Fig. 1.

Fig. 3 is an end view of the remote control device, the outer end section of the casing being removed and the central portion of the device being in transverse section as indicated by the line 3—3 in Fig. 2.

Fig. 4 is a detail view of the locking mechanism.

Fig. 5 is a side elevation of the control box on a reduced scale.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In its general organization, the mechanism embodies a remote control device, indicated at 10 (Fig. 1), by which the tuning adjustments of a radio receiving set 11 may be made from some remote position such, for example, as one which is convenient to the driver of an automobile or other vehicle. In this instance, the remote control device 10 is illustrated as being mounted on the steering column 12 of an automobile. The radio receiving set 11 is mounted at any convenient point on the vehicle chassis or body and includes the usual variable condensers 13, which are adjustable by movement of a condenser shaft 14, and a volume control rheostat 15 which is, in this instance, controllable by a rotatable rheostat shaft 16. The parts 13, 14, 15, and 16 of the receiving set are suitably mounted in an enclosing case 17. Operating mechanisms, principally mounted in the remote control device, are effective through reciprocating elements contained in the flexible cable structure 17a, to separately or individually rotate the condenser shaft 14 and the rheostat shaft 16. Either mechanism may be manipulated by a single actuator in the selective control of the condensers or rheostat.

Referring more particularly to the remote control device, as illustrated in Fig. 2, a hollow casing is provided which may be conveniently formed in three sections comprising an outer end section 18, an inner end section 19, and an intermediate base section 20. Such means as screws 20a secure the sections rigidly together. The inner end section 19 carries such means as a split bracket generally designated at 21 arranged to embrace the steering column 12 for securing the device thereto.

Mounted within the casing are operating mechanisms for the condensers and for the rheostat, which are generally of the type disclosed in my copending application Serial No. 554,394, filed August 1, 1931, now issued as Patent No. 1,926,256, dated September 12, 1933. These mechanisms are preferably mounted one on either side of the base 20, which, it will be seen occupies an intermediate transverse position in the casing. Thus, in the opposite side faces of the base 20 are circular recesses 22, 23 for receiving pulley-like disks 24, 25, respectively. The base has a bore 26 which is axial with respect to the recesses 22, 23 and is defined by sleeves 27 extending outwardly from either side of the base. The sleeves may, if desired, be formed as an integral part of the base. The disks 22, 23 have annular hubs 28, 29, respectively, by which the disks are journaled on the sleeves 27, and these hubs, for an additional purpose to be hereinafter set forth, preferably project radially beyond the outer faces of the disks.

The disks are provided with peripheral grooves 30 and are dimensioned to fit snugly in the recesses 22, 23 with the grooves 30 opposed to the side walls of the recesses. Flexible connecting elements 31, preferably in the form of stranded cables, engage the grooves 30 and the ends of said elements are fastened in any suitable manner to the respective disks. By virtue of the relationship between each groove 30 and the adjacent wall of the base, the flexible elements are closely confined against all other than longitudinal or axial movement. Each side face of the base has a traversing groove 32 (Fig. 3) therein leading from the margin of the recess in that face approximately to the periphery of the base and extending substantially tangentially of the recess. Each groove 32, when the parts are assembled, is in alinement with the groove 30 in the corresponding disk whereby the flexible element thereabout may pass freely from the casing through the groove 32.

Each of the end sections 18, 19 embodies means for closing the grooves 32 to confine the flexible elements snugly therein against lateral movement and, in this instance, the end face 33 of each of said sections is of substantial width to cover the length of the groove 32 opposed thereto. The cable structure 17a is preferably of the type in which the flexible element 31 forms a core snugly encased within a helicoidal winding 31a (Fig. 3) which, in turn, is enclosed within a sheath 31b of fabric or the like. The grooves 32 in the base adjacent the periphery thereof may be of increased diameter as shown at 32a snugly to receive the ends of the helicoidal winding 31a and sheath 31b whereby these parts may be securely clamped between the base and the coacting end sections.

The end sections may be utilized to confine the pulley-like disks 24, 25 in their respective recesses 22, 23 as by providing rabbets 34 in the inner edges of the end faces to overlie at least the peripheral portions of the disks. In order to facilitate proper assembly of the end sections 18, 19 with the base 20, positioning means such as annular ribs 35 fashioned to engage complementary annular grooves 36 in the base may be provided. The ribs 35 will, of course be notched to allow the cable structures 17a to enter the case.

Each disk has an enlarged recess 37 in the face thereof opposite the base to receive friction means such as a spring washer 38 or the like by which a frictional resistance to rotation is imparted to the disks. Suitable stop means 24a and 25a, such as engageable pins on the casing sections 19, 18 and disks 24, 25, limit the extent of rotation of the disks.

Rotary movement of either disk 24, 25 is effective, through the consequent reciprocation of the flexible element 31 connected therewith, to rotate the condenser shaft 14 and rheostat shaft 16. In the present instance, the disk 24 is operatively connected with the rheostat shaft 16 while the disk 25 actuates the condenser shaft 14. While the flexible elements 31 may be operatively connected with the condenser and rheostat shafts in any suitable manner, it is preferred to employ means substantially similar to that shown in my above mentioned copending application. Briefly, each means comprises a pulley 39 of suitable diameter which is rigidly mounted on the shaft to be actuated and to which the end of the proper flexible element 31 is secured. Such means as a chuck device 40 mounted on the case 17 secures each winding 31a and sheath 31b to the case 17 and directs the run of the flexible element 31 toward proper engagement with the pulley 39. Resilient or spring means bears against each pulley 39 to urge said pulley constantly in a rotational direction which is opposite to that imparted to the pulley by a pull on the flexible element 31.

In operation, rotation of either disk 24, 25 in one direction exerts a pull on the corresponding flexible element 31 which rotates the connected pulley 39 at the receiving set in one direction against the tension of the spring associated therewith. The friction exerted on the disks 24, 25 by the spring washers 38 is ample to hold the disks 24, 25 in any position of adjustment. When an opposite rotation is imparted to either disk the flexible element controlled thereby is released to allow rotation of the corresponding pulley by the associated spring. Due to the close confinement of the flexible element 31 against lateral movement throughout substantially its entire length, such opposite rotation of either disk 24, 25 will impart a definite push or thrust force on the flexible element in amplification of the spring action on the pulley 39.

The single means by which tuning adjustment of the condensers 13 or rheostat 15 may be selectively effected preferably comprises the following arrangement of parts: A shaft 41 extends through the bore 26 in the base 20 and has both rotational and axial movement relative thereto. The inner end of the shaft extends beyond the end face of the hub 28 on the disk 24 while the other end of the shaft extends to a point adjacent the outer end of the casing section 18 where it is connected with a finger piece 42. If desired, the finger piece 42 may serve as a closure or end wall for the open face of the outer end section 18. The shaft 41 carries a pair of plates 43, 44 rigidly affixed thereto and spaced apart longitudinally of the shaft a slightly greater distance than that between the outer end-faces of the disk hubs 28, 29.

The outer end-faces on the hubs 28, 29 and the opposed portions of the plates 43, 44 carry complementary clutch elements which, in this instance, are in the form of interengageable teeth 45. Due to the spaced relationship of the plates 43, 44 only one of the pairs of complementary clutch elements are engaged at any one time, and axial reciprocation of the shaft 41 shifts the engagement from one series of clutch elements to the other. Hence, axial movement of the shaft 41 in one direction or the other will establish a driving connection between the shaft and the disk 24 or 25 whereupon rotation of the shaft 41 will adjust the position of the corresponding part at the receiving set.

Preferably, means is provided for normally maintaining the driving connections between the shaft and one of the disks 24 or 25. Since volume control is more frequently used than reception control, it is preferred that the connection which is normally maintained is the one by which control of volume is effected. In this instance, rotation of the rheostat shaft 16 is effected by driving the disk 24. Hence a driving connection between the shaft 41 and disk 24 is normally maintained by such means as a compression spring 46 which encircles the shaft 41 and is seated at one end on the end of the sleeve 27 and at the other end bears against the plate 44. The force of the spring, therefore, normally maintains the parts in the position shown in Fig. 2 wherein the clutch elements 45 between the plate 43 and hub 28 on the disk 24 are engaged.

In operation, the driver of the vehicle or other operator manipulates the hand piece 42 as it is normally presented in controlling the volume of the receiving set. When adjustment of the condensers 13 is desired, the operator presses inwardly on the finger piece 42 thereby moving the shaft 41 axially to disengage the normal driving connection between the plate 43 and disk 24. At the same time, the driving connection between the plate 44 and disk 25 is established so that rotation of the finger piece 42 is then effective to adjust condensers 13. After the condensers have been properly adjusted, the operator need only release the finger piece 42 whereupon the parts return to their normal volume controlling position.

Means movable according to the movement of the condenser shaft 14 is provided for the purpose of indicating to the operator the positions of adjustment of the condensers. To this end, the hub 29 of the disk 25, by which the condenser shaft 14 is driven, carries an annular stamping 47 generally channel-shaped in cross section with the spaced arms forming the channel arranged concentrically. The inner leg of the stamping is the longer and is dimensioned to fit about the hub 29. The parts may have a driven fit or may be secured together in any other suitable manner. The outer and shorter leg of the stamping carries a cylindrically-shaped indicating drum 48 located within and adjacent to the wall of the outer end section 18. An aperture 49 through which the usual indicia on the drum 48 may be seen is formed in the wall of the section 18 and occupies a position facing upwardly toward the driver of the vehicle when the remote control device 10 is secured to the steering column 12.

Preferably, a socket 50, which may be conveniently mounted on the casing section 18, supports a lamp 51 behind the aperture 49 and indicating drum 48. One side of the lamp circuit may be grounded to the casing so that a single wire 52 (Fig. 1) is the only electrical lead running to the control box. The stamping may, if desired, be apertured as at 53 (Fig. 2) to render the lamp 51 accessible through the end of the casing when the finger piece 42 is removed therefrom.

A simple means for locking the radio receiving set in an inoperative or "off" position is provided which makes use of a conventional type of circuit breaking device for interrupting the main power circuit of the receiving set. This type of device is illustrated somewhat diagrammatically in Fig. 1 as comprising normally engaging switch contacts 54 mounted on or adjacent to the rheostat 15 and separable to break the circuit therethrough upon engagement of one of said contacts by a finger 55 carried on the rheostat shaft 16. The finger 55 is so arranged that the circuit is interrupted when the rheostat shaft is moved to one of its extreme limits, usually that limit which adjusts the output volume of the radio receiver to the lowest level.

Referring to Figs. 2 and 4, the inner end of the shaft 41 has an annular groove 56 therein, which groove is engageable by a pin 57 eccentrically mounted on the end of a rotatable barrel 58 constituting a part of a well known type of lock. The pin 57 is arranged to be engaged with the groove 56 only when the shaft 41 is drivingly connected for actuation of the condenser shaft 14. Thus, in the present embodiment of the shaft 41 must be shifted axially to its innermost position before the pin 57 may enter the groove 56. In using the lock, and considering the receiving set to be in operation, the user, through the proper driving connections, rotates the rheostat shaft 16 until the finger 55 breaks the main power circuit through separation of the switch contacts 54. The user then moves the shaft 41 to establish the driving connection with the condenser shaft 14 and manipulates the lock to engage the pin 57 with the recess 56. This engagement, of course, holds the shaft 41 in such position that, while the condenser shaft may be manipulated, the rheostat shaft cannot be turned to reestablish the main power circuit through the switch contacts 54.

From the foregoing description of a preferred form of device embodying the invention, it will be evident that a novel control by which the necessary operative adjustments of a radio receiving set may be effected from a remote point has been provided. The device is exceedingly simple and efficient in operation and is capable of controlling either the condenser shaft or the rheostat shaft with a minimum of lost motion in the operative connections. The ease by which the adjustment of either the condensers or rheostat may be selectively effected through manipulation of a single operating member is decidedly advantageous. Moreover, the arrangement and relationship of parts provides a structure which may be manufactured for sale at a comparatively low cost.

I claim as my invention:

1. In a remote control device for a radio receiving set having a condenser shaft and a volume controlling element, a control box comprising a casing having a base located intermediate the ends of said casing, said base having coaxial recesses formed in the opposite side faces thereof, pulleys in said recesses, flexible connectors engaged with said pulleys and leading from said casing for operative connection respectively with the condenser shaft and volume control element of said receiving set, a shaft in said casing coaxial with said pulleys and movable rotatably and axially relative thereto, driving means on said shaft selectively engageable with either of said pulleys by axial movement of said shaft in one direction or the other, and resilient means exerting a force for normally maintaining one of the driving engagements.

2. In a remote control device for a radio receiving set having a condenser shaft and a volume controlling element, a control box separate from said set and comprising a casing having a base therein provided with a pair of substantially circular recesses, a pulley-like member seated rotatably in each recess, flexible means connected with each pulley and arranged to extend from the casing for operative connection one with said condenser shaft and one with said element, a shaft journaled in said casing and manipulable from the exterior thereof, a selective driving connection between said shaft and either of said members and means for supporting said control box for convenient manipulation of said shaft.

3. In a device of the character described, a control box comprising, in combination, a casing having a pair of coaxial rotatable control members arranged to be connected one with the condenser shaft and the other with the volume controlling rheostat of a radio receiving set, an axially shiftable shaft common to said members and rotatable relative thereto, driving means for each member on said shaft and movable in the shifting movement of said shaft to establish a driving connection between said shaft and one or the other of said members, and resilient means exerting a thrust force on said shaft tending to maintain a driving connection between said shaft and the member which operates said rheostat.

4. A remote control device for radio receiving sets comprising, in combination, with the condenser tuning shaft and volume control rheostat of the set, a rotatable member fixed to each of said parts and spring urged in one direction, a remote control mechanism located at a distant point including a corresponding rotatable element for each of said first mentioned rotatable members, flexible means connecting the rotatable members of the control mechanism with the corresponding members at said receiving set, an actuating shaft, and means movable selectively to establish a driving connection between said shaft and either of said remotely positioned rotatable members.

5. In a remote control device for radio receiving sets, a control mechanism comprising a base having circular recesses in the opposite side faces, a shaft journaled in said base and extending therethrough, pulleys rotatably mounted on said shaft and seated one in each recess, flexible connectors engaging said pulleys, said base having a groove in each face extending substantially tangentially of said recesses to approximately the same position near the periphery of said base to receive and lead said connecters from said pulleys, casing parts detachably secured to both sides of said base each including a part fashioned to overlie the groove in the adjacent face of the base to confine the connecter therein, and means manipulable by the operator for separately driving said pulleys.

6. In a remote control device for radio receiving sets, a control mechanism comprising a base having circular recesses in the opposite side faces, pulleys rotatably seated one in each recess, flexible connecters engaging said pulleys, said base having a groove in each face extending substantially tangentially of said recesses to approximately the periphery of said base to receive and lead said connecters from said pulleys, means detachably secured to both sides of said base each including a part overlying the groove in the adjacent face of the base to confine the connecter therein, and manipulable means for rotating said pulleys.

7. In a remote control device for radio receiving sets, a control mechanism comprising a base having circular recesses therein, pulleys rotatably seated one in each recess, flexible connecters engaging said pulleys, said base having grooves therein extending from said recesses to receive and lead said connecters from said pulleys, means detachably secured to said base in overlying relation to the grooves therein to confine the connecters to the grooves, and a single manipulable means for selectively rotating said pulleys.

8. A remote control device for radio receiving sets comprising, in combination with the tuning and volume control means of the set, a base member rigidly mounted and providing support for control mechanism on both sides thereof, an axially shiftable rotary shaft having a part passing through said base, control means on one side of said base for governing operation of said tuning means and control means on the other side of said base for governing operation of said volume control means, operating means secured fast upon said shaft and operable on opposite sides of said base adjacent said control means for selectively engaging either of the latter, said operating means being arranged so as to be in engagement with only one of the respective control means at a time, whereby said shaft must be axially shifted for transferring engagement from one to the other of said control means.

9. A remote control device for radio receiving sets comprising, in combination with the tuning and volume control means of the set, a base member rigidly mounted and providing support for control mechanism on both sides thereof, an axially shiftable rotary shaft having a part passing through said base, control means on one side of said base for governing operation of said tuning means and control means on the other side of said base for governing operation of said volume control means, separate operating means secured fast upon said shaft and effective on opposite sides of said base adjacent said control means for selectively engaging either of the latter, said means being arranged so that only one at a time is in engagement with the respective control means, thereby requiring axial shifting of said shaft for transferring engagement from one to the other of said control means, and means for engaging the inner end of said shaft to lock the same against disengagement of one of said operating means from one of said control means.

10. In a remote control device for radio receiving sets having tuning and volume control mechanisms, a control box arranged to be located at a point remote from said set, said box comprising two parts adapted to be connected in axial alinement, a base extending transversely between said parts, an axially shiftable shaft passing through said base and arranged for convenient manipulation by the operator, means on one side of said base for controlling operation of said tuning mechanism, means on the opposite side of said base for governing operation of said volume control mechanism, means for connecting said last mentioned means with said tuning and volume control mechanisms, and means on said shaft on opposite sides of said base for selectively engaging either of said control means by shifting said shaft.

EDWARD L. BARRETT.

CERTIFICATE OF CORRECTION.

Patent No. 2,046,911.  July 7, 1936.

EDWARD L. BARRETT.

It is hereby certified that error appears in the printed specification of the above numbered patent rquiring correction as follows: Page 3, first column, line 35, for the word "ports" read parts; and second column, line 9, strike out the word "of"; and that the said Letters Patent should be read with these corrections therein that the same may conform to the record of the case in the Patent Office.

Signed and sealed this 29th day of September, A. D. 1936.

Henry Van Arsdale

(Seal)  Acting Commissioner of Patents.